United States Patent [19]

MacKendrick et al.

[11] Patent Number: 4,596,054

[45] Date of Patent: Jun. 24, 1986

[54] PRESSURE SEALING BEARING ASSEMBLY FOR USE IN ENVIRONMENTAL CONTROL SUITS AND ENVIRONMENTAL SUITS CONTAINING SUCH BEARING ASSEMBLIES

[75] Inventors: Robert R. MacKendrick, Milford; Dennis L. Finch, West Haven, both of Conn.

[73] Assignee: Air-Lock, Incorporated, Milford, Conn.

[21] Appl. No.: 627,455

[22] Filed: Jul. 3, 1984

[51] Int. Cl.⁴ .................... A62B 17/00; B63C 11/04; F16J 15/32

[52] U.S. Cl. .................. 2/2.1 A; 277/81 R; 277/199; 384/471

[58] Field of Search ............. 2/2.1 A; 277/81 R, 199; 308/187.2

[56] References Cited

U.S. PATENT DOCUMENTS

| | | |
|---|---|---|
| 2,210,723 | 8/1940 | Kosatka . |
| 3,000,014 | 9/1961 | White .................... 2/270 |
| 3,067,425 | 12/1962 | Colley .................... 2/6 |
| 3,399,370 | 8/1968 | Mack . |
| 3,494,681 | 2/1970 | Anderson et al. ........... 308/187.2 |
| 3,636,564 | 1/1972 | Vykukal ................... 2/2.1 A |
| 3,680,977 | 8/1972 | Rabouyt et al. ........... 277/65 |
| 3,805,882 | 4/1974 | Vallance .................. 277/81 R |
| 3,822,890 | 7/1974 | Bourgeois ................ 277/65 |
| 4,046,262 | 9/1977 | Vykukal et al. ........... 2/2.1 A |
| 4,091,464 | 5/1978 | Vykukal .................. 2/2.1 A |
| 4,091,465 | 5/1978 | Webbon et al. ............ 2/2.1 A |
| 4,123,068 | 10/1978 | Van Gorder ............... 277/27 |
| 4,151,612 | 5/1979 | Vykukal .................. 2/2.1 A |
| 4,186,929 | 2/1980 | Burton et al. ............ 277/27 |
| 4,283,064 | 8/1981 | Staab et al. ............. 277/81 R |
| 4,294,700 | 10/1981 | Casper ................... 277/81 R |
| 4,344,631 | 8/1982 | Winn ..................... 277/29 |
| 4,399,999 | 8/1983 | Wold ..................... 277/199 |

Primary Examiner—Louis K. Rimrodt

[57] ABSTRACT

A bearing assembly for sealing the relatively rotatable adjoining portions of a pressurized environmental control suit for human use utilizes a pair of rotatable bearing members with an annular sealing member having a body portion and a lip portion extending from the body portion at an angle thereto. The lip portion includes an outer end portion of relatively thin cross section and a thicker portion disposed adjacent the body portion. The relatively thin outer end portion deflects in contact with the opposed surface and extends therealong to provide a seal therewith with relatively little friction. Upon conditions for extreme pressure differential, the thicker portion of the lip will be deflected to increase the amount of lip length bearing upon the surface of the opposed member to increase the sealing action.

12 Claims, 5 Drawing Figures

PRESSURE SEALING BEARING ASSEMBLY FOR USE IN ENVIRONMENTAL CONTROL SUITS AND ENVIRONMENTAL SUITS CONTAINING SUCH BEARING ASSEMBLIES

FIELD OF THE INVENTION

This invention relates to pressurized environmental control suits employing bearings between rotatable portions with a pressure seal therein, and to the pressure sealed bearing assemblies used therein.

BACKGROUND OF THE INVENTION

Lip seals are frequently used between two relatively rotatable members to provide a seal between two areas having a pressure differential. The lip seal is so formed that the higher pressure forces the lip on one member into engagement with the other member, which will usually be that exhibiting the greater rotational tendency. The frictional engagement of the lip seal on the other member produces drag on that member as it rotates, and more rotational force or torque must be expended to overcome this drag. In most cases, this drag is not an item of concern; however, where the available torque driving the rotating member is limited, this drag may become of significant concern.

Space suits, as exemplified by U.S. Pat. No. 3,636,564, generally include rotatable joints to permit natural body motion. Present space suits make use of ball bearings with lip seals to provide rotary motion for the arms, legs, head and torso, and to provide for bending motion at various body joints. A problem arises in sealing the space between the two components of the bearing assemblies provided at these joints, and low torque is required for ease of movement and to reduce fatigue during movement.

Moreover, in a space suit, all rotatable joints of the suit are not in parallel planes, and low bearing torque is absolutely essential, since sections of the space suit must be made to rotate by bending motion of the human body. High torque multiples the bending force required to flex the joint. As a result, it has become apparent that low torque bearings would be extremely beneficial for use in space suits.

It has been determined that approximately ninety-nine percent of the torque in the bearings presently used on space suits comes from the seal which is required to maintain the suit pressure wherever a bearing is used. Space suits are pressurized and a seal is required to prevent the passage of the pressurized fluid through the bearing races, by providing a lip or the like in that space on one member of the bearing assembly which bears on an opposing cylindrical surface. This force is made up of two components—an initial force caused by the deflection of the lip from its at rest position, i.e. the position it would take if there was no opposing cylindrical surface for it to bear against, and the force caused by the pressure of the fluid being contained pressing on the lip and forcing it against the opposing surface.

It is an object of the present invention to provide a bearing assembly for use in environmental control suits utilizing between relatively rotatable members a novel, improved lip seal which is highly effecting in minimizing leakage thereby of fluid under pressure and which requires relatively low torque to effect rotational movement.

It is also an object to provide such bearing assembly with a lip seal which has portions of differing flexural characteristics to flex depending upon the pressure differential and thereby the deflection required to provide the sealing action.

A specific object is to provide an environmental suit for a human being which employs bearing assemblies with novel lip seals at various joints to provide excellent sealing characteristics while minimizing the torque required to effect relative movement of the surfaces being sealed.

SUMMARY OF THE INVENTION

It has now been found that the foregoing and related objects can be readily attained by use of a bearing assembly for sealing a fluid under pressure between a pair of relatively rotatable members and including a first bearing member providing a recess therein having a cylindrical surface portion. A second bearing member extends within the recess of the first bearing member and has a generally peripheral surface portion opposing the cylindrical surface portion of the first bearing member. One of the bearing members has an annular recess extending about its opposed cylindrical surface portion in which is disposed a generally annular sealing member of resiliently deflectable material. The sealing member has a body portion seated in the annular recess and a lip portion extending outwardly therefrom and bearing upon the opposed surface portion of the other members. This lip portion extends at an angle from the body portion and relative to the opposed surface portion with an outer edge portion of relatively thin cross section being deflected by and bearing upon the opposed surface portion. The lip portion also has an inner portion of larger cross section adjacent the body portion. The outer portion of the lip portion is readily flexible and has its outer end extending along the surface of the opposed bearing member, but the inner portion is less flexible and deflectable only by higher pressure differentials. As a result, only the end of the outer portion of the lip is normally deflected to provide the sealing action during conditions of normal pressure differentials. However, the entire lip portion may be deflected during conditions of high pressure differential to increase the length of the surface of the lip portion bearing upon the opposed bearing member and thereby result in enhanced sealing action.

In the preferred embodiment of the present invention, the opposed cylindrical surface of the bearing members have opposed race recesses axially spaced from and adjacent to the sealing member, and spherical ball bearings are disposed therewithin. Desirably, synthetic resin spherical spacer members are disposed in the race recesses between the ball bearings.

In addition, aligned sealing recesses are provided in the opposed surfaces of the first and second bearing members spaced axially outwardly from the sealing member and race recesses, and there are included in the assembly annular sealing elements seated in the sealing recesses to prevent the flow of dust and the like into the space between the bearing members about the sealing member and ball bearings.

Most desirably, the thickness of the outer lip portion is about 0.003–0.010 inch, and that of the inner lip portion is 0.015–0.035 inch so as to provide a ratio of about 3–5:1. The length of the outer lip portion is 0.007–0.020 inch, and the length of the inner lip portion is 0.035–0.055 inch so as to provide a ratio of about 2.5–5.0:1.

The bearing assembly of the present invention is used in pressurized environmental control suits for human use of the type having a torso portion, leg portions, arm portions, hand portions and foot portions. The adjacent ends of at least some of the suit portions are rotatable with respect to each other and the bearing assemblies are provided between the cooperating rotatable ends with one of the bearing members being affixed to the one portion and the other being affixed to the other portion by means providing firm sealed engagement therewith.

DETAILED DESCRIPTION OF THE ILLUSTRATED EMBODIMENT

Figure 1:
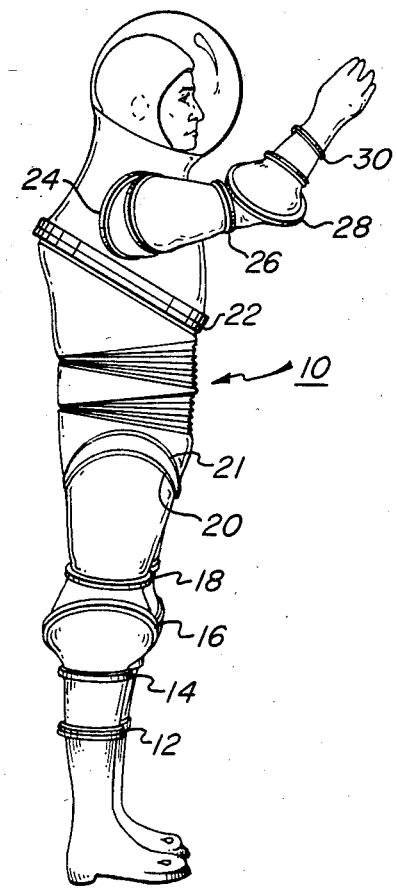
FIG. 1 is a representation of a man in a space suit showing various joints where articulation or rotation is required to permit his movement.

Turning first to FIG. 1 of the attached drawings, therein illustrated is a pressurized environmental control suit of the type worn by astronauts and described in U.S. Pat. No. 3636,564. The suit is generally designated by the numeral 10, and includes torso, leg, arm, foot, hand and head portions with abutting end portions provided with relatively rotatable joints 12-30.

It may be noted that the joints 16, 20, 21, 22 and 28 are not on axes which coincide with the direction of extension of the legs, torso, and arms. Therefore, it is imperative that there be low bearing torque at these joints since they must be made to rotate by the bending motion of a human joint.

Figure 2:
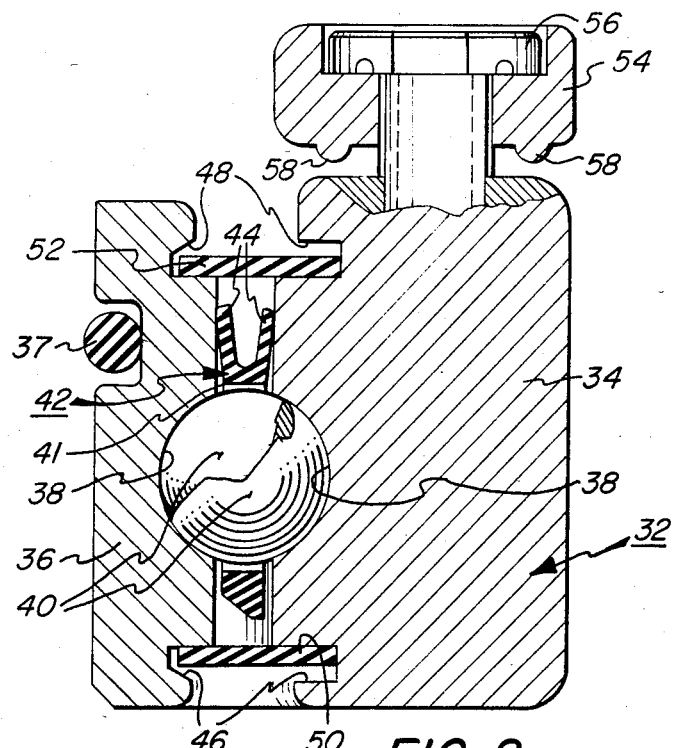
FIG. 2 is a sectional view through a prior art bearing assembly used in space suits.

In FIG. 2, there is illustrated a prior art bearing assembly 32 of the type frequently employed at the relatively rotatable joints in such space suits. The assembly 32 is generally comprised of a pair of races 34, 36 held in assembly by the O-ring 37. The races 34, 36 have opposed, cooperating race recesses 38 in which are disposed the ball bearings 40 which are spaced along and disposed in apertures 41 in an annular sealing member generally designated by the numeral 42 which extends in the spacing between the opposed faces of the races 34, 36. At its high pressure side, the sealing member 42 is bifurcated to provide a pair of outwardly diverging fingers 44 bearing upon the opposed cylindrical races surfaces.

Seated in opposed recesses 46, 48 are environmental sealing rings 50, 52 to prevent dust and contaminants from entering the ball bearing and sealing lip areas. A typical clamping means for clamping the races 34, 36 to the fabric of the suit is shown on the race 34. A clamping ring 54 extends about the face of the race to be secured to the end portion of the suit fabric. At spaced intervals, bolts 56 extend through apertures in the fabric and ring 54 and threadably engage in apertures in the body of the race 34. As the bolts 56 are tightened, bosses 58 on the ring 54 clamp the fabric tightly between the ring 54 and race 34.

As will be appreciated, pressure within the suit acts upon the inside surfaces of the fingers 44 to deflect them against the opposed cylindrical surfaces and thereby provide sealing action. However, this sealing action also provides considerable drag or frictional resistance to relative rotation, thus requiring a large amount of torque to effect rotation.

Figure 3:
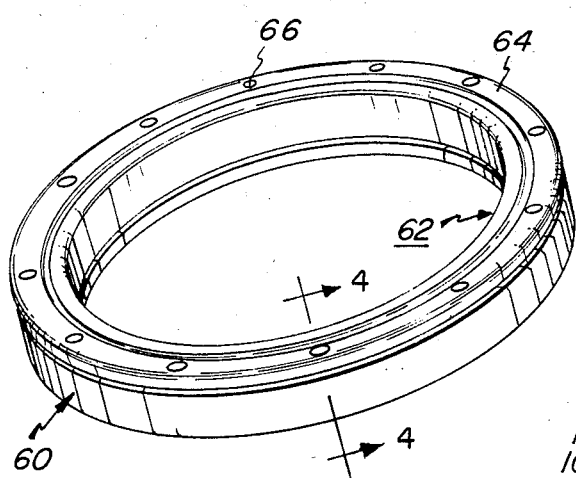
FIG. 3 is a perspective view of a bearing assembly embodying the present invention.

Turning now to FIG. 3, therein illustrated is a bearing assembly of the present invention generally comprised of a pair of races designated by the numerals 60, 62 and showing a clamp ring 64 secured to race 60 by bolts 66.

Figure 4:
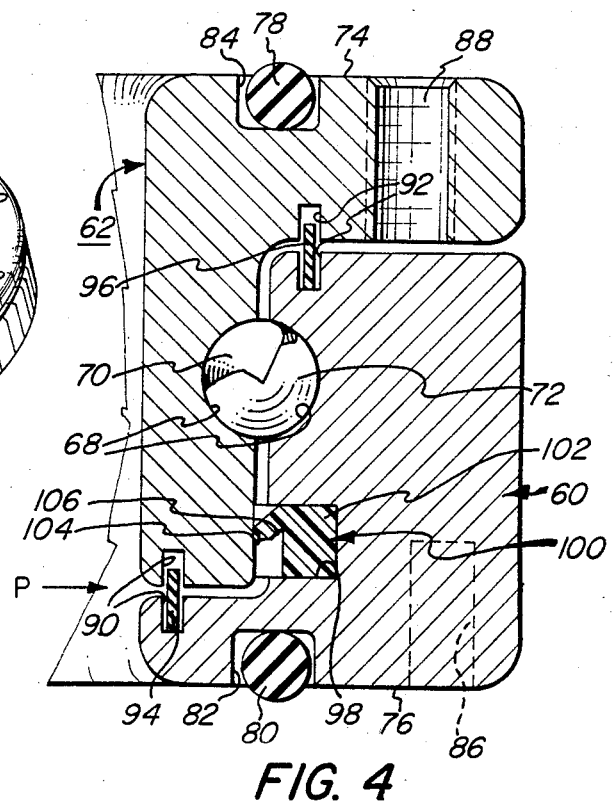
FIG. 4 is a cross sectional view of the bearing assembly along the line 4—4 of FIG. 3 and drawn to an enlarged scale.

Turning now to FIG. 4, the bearing assembly of the present invention includes an outer race 60 providing a cylindrical surface portion on its periphery and an inner race 62 having a cylindrical peripheral surface portion opposing the cylindrical surface portion of the outer race 60. The opposed cylindrical surfaces of the races 60, 62 have opposed raceways 68 in which alternate steel ball bearings 70 and spacing spheres 72 of synthetic resin.

The pressure side of the bearing assembly is indicated by the arrow P. The material of the space suit is attached to the upper surface 74 of race 60 and to the lower surface 76 of race 62 in a manner similar to that previously described. Clamping rings (numeral 64 in FIG. 3) are secured to surfaces 74 and 76 overlying O-ring seals 78 and 80 seated in recesses 82 and 84, respectively, to insure an airtight coupling between the races and the material of the suit. Bolts 66 (seen in FIG. 3) are received in threaded apertures 86 and 88 in races 60 and 62 respectively, and the clamping rings 64 have smooth undersurfaces which cooperate with the O-ring seals 78 and 80. Aligned recesses 90 and 92 are formed in the races 60 and 62 at the ends of the opposed cylindrical surfaces and seat environmental seals 94 and 96.

On the upstream or high pressure side of the raceways 68, the cylindrical surface of the outer race 60 is provided with channel 98 in which is seated the annular sealing member generally designated by the numeral 100. The sealing member 100 is integrally formed from resiliently deflectable synthetic resin and has a body portion 102 seated in the channel 98 and a lip portion extending at an angle therefrom towards the high pressure side of the bearing assembly. The lip portion is comprised of a relatively thin outer end portion 104 and a thicker inner portion 106 adjacent the body portion 102.

Figure 5:
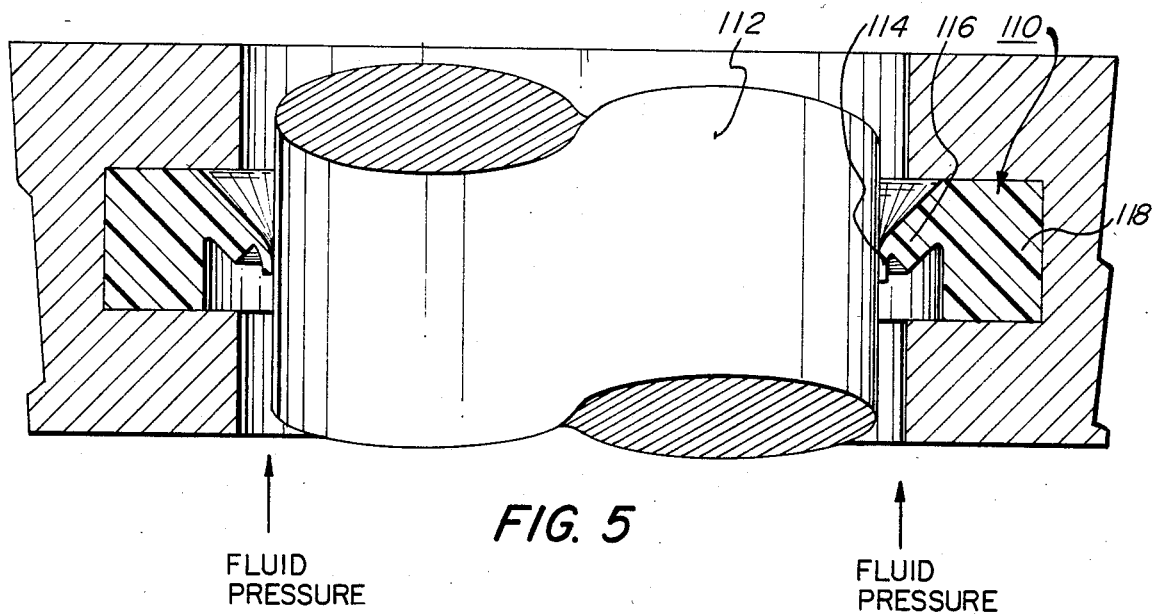
FIG. 5 is a fragmentary cross sectional view of a shaft rotatable in a housing and employing a lip seal embodying the present invention to illustrate the operation of the seal.

Turning now to FIG. 5, the sealing member of the present invention is generally designated by the numeral 110 and is illustrated in combination with a rotatable shaft 112 for ease of explanation of the flexural and sealing action. As illustrated in FIG. 4, the lip portion includes a relatively thin outer portion 114 which bears against and is deflected by the surface of the shaft 112 so that it extends along its surface to provide sealing engagement therewith. The lip portion is dimensioned so that only the outer end portion 114 will normally be deflected by the radial pressure of the shaft 112. Since it is relatively highly flexible by reason of its thin section, it provides relatively little drag or frictional resistance to rotation of the shaft 112.

Under conditions of higher pressure differential, the pressure acting on the lip portion will tend to deflect the thicker inner portion 116 outwardly to increase the included angle and increase the length of the lip portion disposed against the surface of the shaft 112 and thus the sealing pressure. This prevents the relatively thin outer lip portion 114 from being inverted by the pressure.

Thus, the thicker inner portion 116 of the lip provides overpressure protection in that it will deflect under increased pressure, moving closer to the surface of shaft 112 and preventing the thinner lip portion 114 from being inverted by the pressure of the fluid. The thicker lip portion 116 is sufficiently long so that it cannot extend perpendicularly to body portion 118.

The sealing member is fabricated from a relatively resilient and durable synthetic resin providing a reasonably high degree of resilient flexibility. Polyurethane having a durometer of 65–85 on the Shore A scale has been particularly advantageous. As has been previously described, the lip portion extends from the body at an angle towards the high pressure area within the environmental control suit; that angle is in the range of 35 to 55 degrees, and preferably 42–48 degrees.

The thin outer end portion of the lip has a thickness of 0.003–0.010 inch, and preferably 0.004–0.006 inch. Its length is 0.007–0.020 inch, and preferably 0.010–0.015 inch. The thicker inner section of the lip is 0.015–0.035 inch in thickness and preferably 0.020–0.030 inch; its length is 0.035–0.055 inch, and preferably 0.040–0.050 inch. Thus, the ratio of the lengths is 2.5–5.0:1 and that of the thicknesses is 3–5.0:1.

The surface of the outer race carrying the lip member will normally be spaced from the surface of the inner race member a distance that will provide for deflection of approximately one-half the length of the relatively thin outer portion of the lip so as to cause it to extend along the surface of the opposed bearing member.

Thus, it can be seen from the foregoing detailed specification and attached drawings that the bearing assembly of the present invention provides a highly effective seal between the relatively rotatable portions of environmental control suits of the pressurized variety. This bearing assembly provides good sealing action while normally maintaining a relatively low level of drag or frictional resistance to rotation, but provides enhanced means responsive to a higher pressure differential to increase the length of lip bearing against the surface of the opposed member to insure desirable sealing characteristics albeit with greater frictional resistance.

Having thus described the invention, what is claimed is:

1. A bearing assembly for sealing a fluid under pressure between a pair of relatively rotatable members comprising:
   A. a first bearing member providing a recess therewithin having a cylindrical surface portion;
   B. a second bearing member extending within said recess of said first bearing member and having a cylindrical peripheral surface portion opposing said cylindrical surface portion of said first bearing member, one of said bearing members having an annular recess extending about its opposed surface portion;
   C. a generally annular sealing member of resiliently deflectable material having a body portion seated in said annular recess and a lip portion extending outwardly therefrom and bearing upon the opposed surface portion of the other of said members, said sealing member lip portion extending at an angle from said body portion and to the opposed surface portion and having an outer portion of relatively thin cross section deflected by and bearing upon said opposed surface and an inner portion of thicker cross section adjacent said body portion, said outer portion being readily flexible and having its outer end portion extending along said opposed surface, said inner portion being less flexible and deflectable by higher pressure differential, whereby only the end portion of said outer portion is normally deflected to provide the sealing action during conditions of normal pressure differential and the entire lip portion may be deflected during conditions of high pressure differential to increase the length of the surface of said lip portion being on the opposed member and thereby the sealing action.

2. The bearing assembly of claim 1 wherein said bearing members have aligned race recesses adjacent but axially spaced from said sealing member, and include spherical ball bearings disposed therein.

3. The bearing assembly of claim 2 wherein synthetic resin spherical spacer members are disposed in said race recesses between said ball bearings.

4. The bearing assembly of claim 2 wherein aligned sealing recesses are provided in said first and second bearing members spaced axially outwardly from said sealing member and race recesses and including annular environmental sealing elements seated in said sealing recesses to prevent the flow of dust and the like into the space between said bearing members containing said sealing member and ball bearings.

5. The bearing assembly of claim 1 wherein the thickness of said outer lip portion is about 0.003–0.010 inch and that of said inner lip portion in 0.015–0.035 inch.

6. The bearing assembly of claim 5 wherein the length of said outer lip portion is 0.007–0.020 inch and the length of said inner lip portion is 0.035–0.055 inch.

7. In a pressurized environmental control suit for human use, the combination comprising:
   A. a suit having a torso portion, leg portions, arm portions, foot portions and hand portions, the adjacent ends of at least some of said suit portions being rotatable with respect to each other; and
   B. bearing assemblies between adjacent rotatable ends of said seat portions including:
      i. a first bearing member secured to one of the adjacent ends and providing a recess therewithin having a cylindrical surface portion;
      ii. a second bearing member secured to the other one of said adjacent ends and extending within said recess of said first bearing member and having a cylindrical surface portion of said first bearing member, one of said bearing members having an annular recess extending about its opposed surface portion;
      iii. a generally annular sealing member of resiliently deflectable material having a body portion seated in said annular recess and a lip portion extending outwardly therefrom and bearing upon the opposed surface portion of the other of said members, said sealing member lip portion extending at an angle from said body portion and to the opposed surface portion and having an outer portion of relatively thin cross section deflected by and bearing upon said opposed surface and an inner portion of thicker cross section adjacent said body portion, said outer lip portion being readily flexible and having its outer end portion extending along said opposed surface, said inner portion being less flexible and deflectable by higher pressure differential, whereby only the end portion of said outer portion is normally deflected to provide the sealing action during conditions of normal pressure differential and the entire lip portion may be deflected during conditions of high pressure differential to increase the length of the surface of said lip portion bearing on the opposed member and thereby the sealing action.

8. The control suit of claim 7 wherein said bearing members have aligned race recesses adjacent but axially spaced from said sealing member and include spherical ball bearings disposed therein.

9. The control suit of claim 8 wherein synthetic resin spherical spacer members are disposed in said race recesses between said ball bearings.

10. The control suit of claim 8 wherein aligned sealing recesses are provided in said first and second bearing members spaced axially outwardly from said sealing member and race recesses and including annular environmental sealing elements seated in said sealing recesses to prevent the flow of dust and the like into the space between said bearing members containing said sealing member and ball bearings.

11. The control suit of claim 7 wherein the thickness of said outer lip portion is about 0.003–0.010 inch and that of said inner lip portion is 0.015–0.035 inch.

12. The control suit of claim 11 wherein the length of said outer lip portion is 0.007–0.020 inch and the length of said inner lip portion is 0.035–0.055 inch.

* * * * *

UNITED STATES PATENT AND TRADEMARK OFFICE
CERTIFICATE OF CORRECTION

PATENT NO. : 4,596,054

DATED : June 24, 1986

INVENTOR(S) : Robert R. MacKendrick and Dennis L. Finch

It is certified that error appears in the above—identified patent and that said Letters Patent is hereby corrected as shown below:

Column 6, line 11 "being" should be -- bearing --.

Signed and Sealed this

Third Day of February, 1987

Attest:

DONALD J. QUIGG

*Attesting Officer*

*Commissioner of Patents and Trademarks*